(12) United States Patent
Buck

(10) Patent No.: US 6,349,475 B1
(45) Date of Patent: Feb. 26, 2002

(54) DEBRIS BLOWING WEED TRIMMER

(76) Inventor: Mark A. Buck, 212 E. Lincoln, Medicine Lodge, KS (US) 67104

( * ) Notice: Subject to any disclaimer, the term of this patent is extended or adjusted under 35 U.S.C. 154(b) by 0 days.

(21) Appl. No.: 09/440,002

(22) Filed: Nov. 12, 1999

(51) Int. Cl.[7] .............................. A01D 34/67; B25F 3/00
(52) U.S. Cl. ......................... 30/276; 30/122; 56/12.7; 56/12.8; 56/13.4
(58) Field of Search ................... 30/270, 347, 272.1, 30/122; 56/12.7, 12.8, 13.4; 172/13, 14, 41, 110, 111; 83/698.41, 698.71; D23/370, 377, 378, 383; 392/361; 454/230, 201, 208

(56) References Cited

U.S. PATENT DOCUMENTS

| | | | | |
|---|---|---|---|---|
| 4,187,577 A | * | 2/1980 | Hansen et al. | 15/328 |
| 4,242,794 A | * | 1/1981 | Peterson | 30/122 |
| 4,320,617 A | * | 3/1982 | Fedeli | 56/295 |
| 4,335,567 A | * | 6/1982 | Comer | 56/12.7 |
| 4,604,067 A | * | 8/1986 | Roberts | 440/49 |
| 4,827,702 A | * | 5/1989 | Cerreta | 56/12.7 |
| 4,835,950 A | * | 6/1989 | Cerreta | 56/12.8 |
| 5,649,413 A | * | 7/1997 | Oostendorp | 56/12.7 |

* cited by examiner

Primary Examiner—Boyer Ashley
(74) Attorney, Agent, or Firm—Kenneth H. Jack; Davis & Jack, L.L.C.

(57) ABSTRACT

An implement for trimming grass and weeds, and for blowing clippings and debris. The implement consists of a rotatable housing having an outer wall; at least two fan blades, each of the fan blades having an inner end and an outer end; and at least two slide channels interconnecting each of the fan blades with the rotatable housing. The slide channels allow the outer ends of the fan blades to alternately extend from the outer wall of the rotatable housing to a fully extended position, and retract toward said outer wall to a fully retracted position. A weed trimming line is fixedly attached to and extends outwardly from the rotatable housing for performing weed trimming as a function in addition to debris blowing.

20 Claims, 4 Drawing Sheets

DEBRIS BLOWING WEED TRIMMER

FIELD OF THE INVENTION

This invention relates to electric and gas powered weed and brush trimmers. More particularly, this invention relates to such trimmers adapted for alternately serving as a grass and debris blower.

BACKGROUND OF THE INVENTION

The adaptation of a weed cutting or trimming implement to alternately or simultaneously blow grass and debris is taught by U.S. Pat. No. 5,345,788 issued Sep. 13, 1994, to Jerry; disclosing a steel blade having air driving fins protruding therefrom. A similar adaptation of a grass or weed cutting blade is taught by U.S. Pat. No. 5,233,820 issued Aug. 10, 1993, to Willsie. In another expression of the concept, U.S. Pat. No. 4,827,702 issued May 9, 1999, teaches a rotatable flexible line trimmer having a fan blade ring removably attached to its rotatable trimmer head. Adaptations of weed or grass cutting blades to propel air for debris removal are undesirable because the air propelling function dissipates power needed for cutting. Adaptations of line trimmer heads to include attachable and detachable air propelling blades are similarly undesirable because detachable fan blades may be lost or misplaced, and attachment and detachment steps are inconvenient and cumbersome.

The instant invention overcomes the disadvantages described above by providing a weed trimmer head having alternately extendable and retractable fan blades; the trimmer head thereby allowing, upon retraction of the fan blades, full rotary power to be applied to a weed cutting element; and alternately allowing, upon extension of the fan blades, air sweeping of debris from sidewalks and curbs.

BRIEF SUMMARY OF THE INVENTION

The instant inventive trimmer-blower preferably comprises a cylindrical housing having an upper wall or ceiling spanning across its upper end. The upper surface of the upper wall is preferably adapted for attachment to the drive linkage of an electric or gasoline powered handheld or shoulder mounted weed and grass trimmer. Where the drive linkage of such trimmer comprises a spirally threaded lug, an internally spirally threaded nut embedded axially within and extending upwardly from said upper wall is preferably utilized as the attaching means. A steel ring or collar, through which a threaded bolt upwardly passes, may alternately be utilized where the trimmer includes a female drive linkage.

The above described cylindrical rotatable housing preferably defines a downwardly opening cylindrical space within which at least two fan blades are slidably mounted for alternate outward extension and inward retraction. Preferably, slide channels for guiding the fan blades' outward extension and inward retraction are fixedly situated within the housing. Also preferably, the channels comprise a series of slide stopping or slide resisting walls and ridges for selectively holding the fan blades in their extended or retracted positions within the housing.

Preferably, the downward opening of the cylindrical space is closed by a removably attached lower wall, the upper surface of such lower wall providing lower slide surfaces of the slide channels.

Preferably, the housing has weed trimmer line or blade extending means integral with the lower wall or lower side wall of the housing; such means being positioned below the blades, allowing the implement to be alternately utilized for grass and debris blowing and for weed trimming.

Accordingly, it is an object of the present invention to provide a rotatable weed trimmer head which is adapted for alternately blowing grass clippings and debris.

It is a further object of the present invention to provide such an implement having alternately extendable and retractable air propelling fan blades.

Other and further objects, benefits, and advantages of the present invention will become known to those skilled in the art upon review of the Detailed Description which follows, and upon review of the appended drawings.

DETAILED DESCRIPTION OF THE PREFERRED EMBODIMENT

Figure 1:
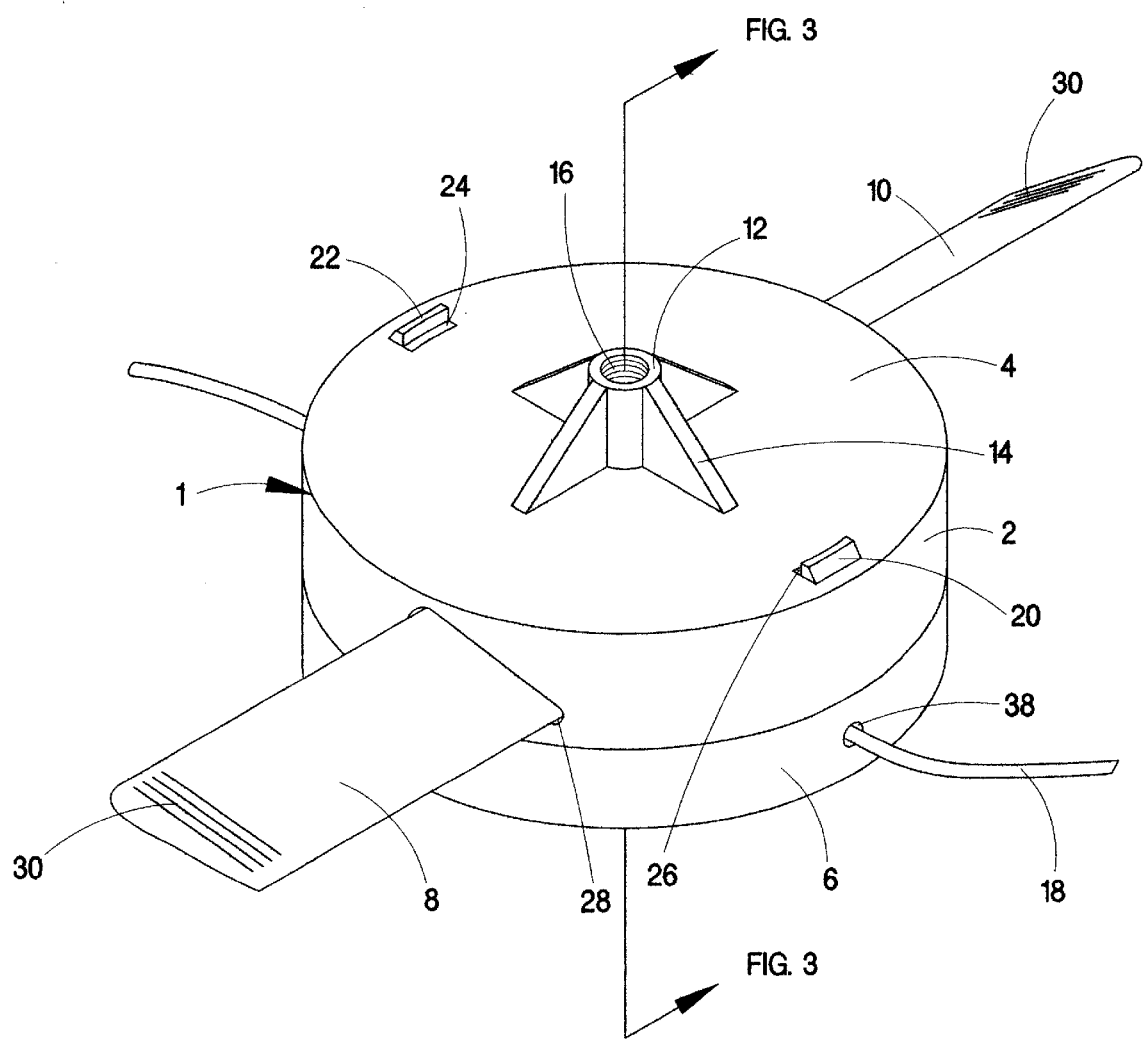
FIG. 1 is an isometric view of the present inventive weed trimming and debris blowing implement.
Figure 2:
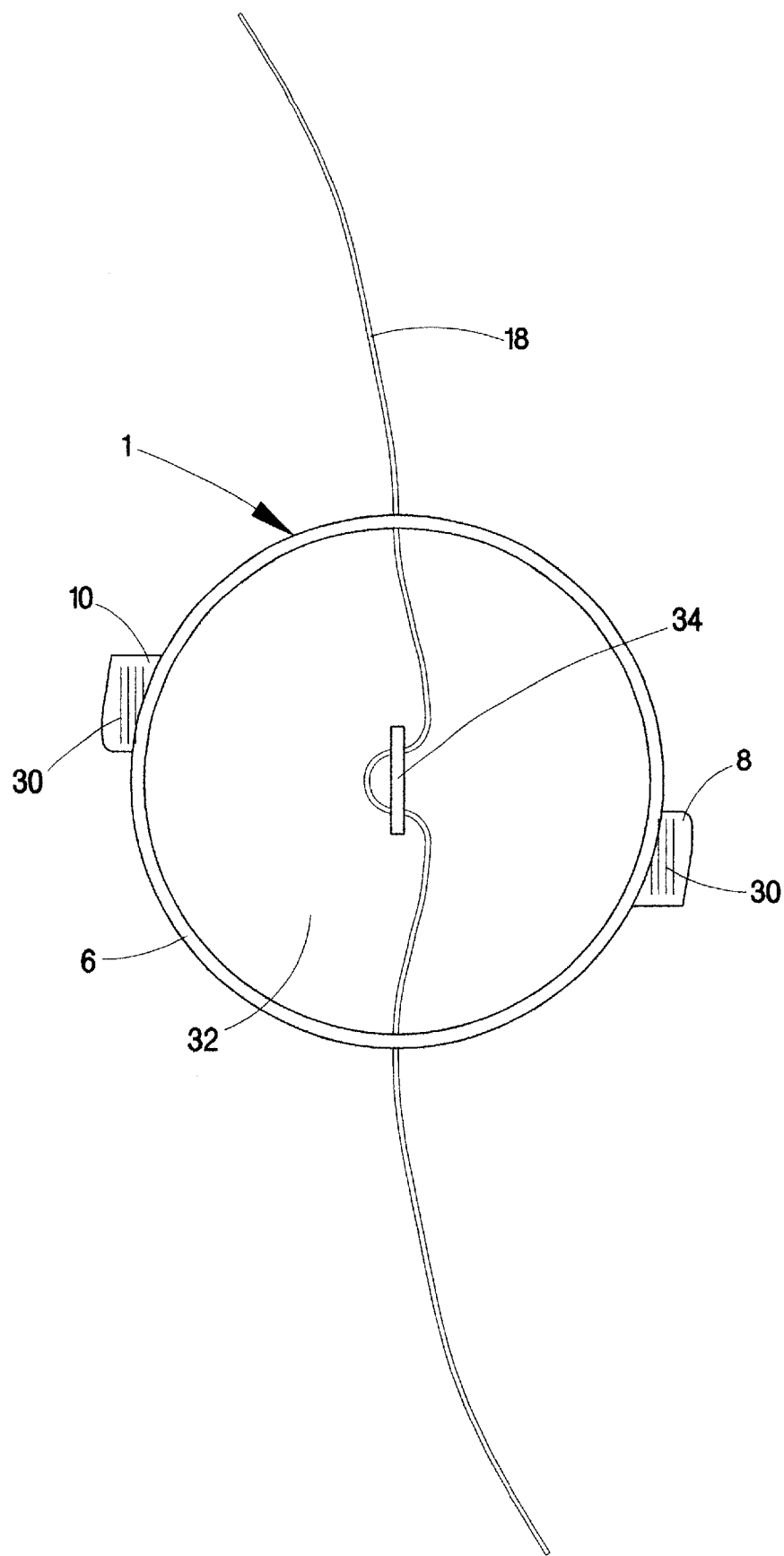
FIG. 2 is a plan view of the undersurface of the implement depicted in FIG. 1, the view showing fan blades in their retracted positions.
Figure 3:
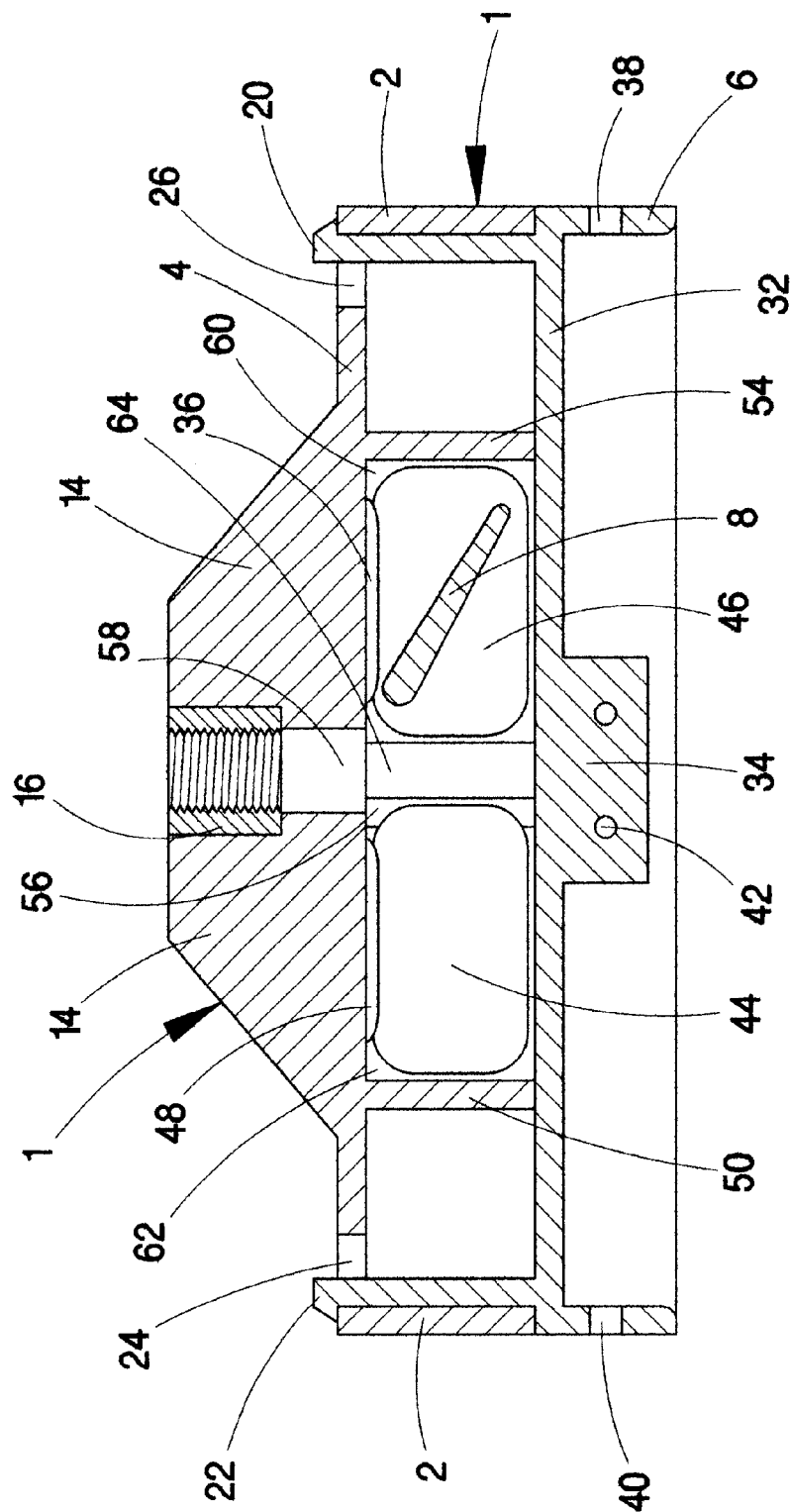
FIG. 3 is a sectional view as indicated in FIG. 1, the view of FIG. 3 showing trimmer line removed and showing fan blades repositioned.
Figure 4:
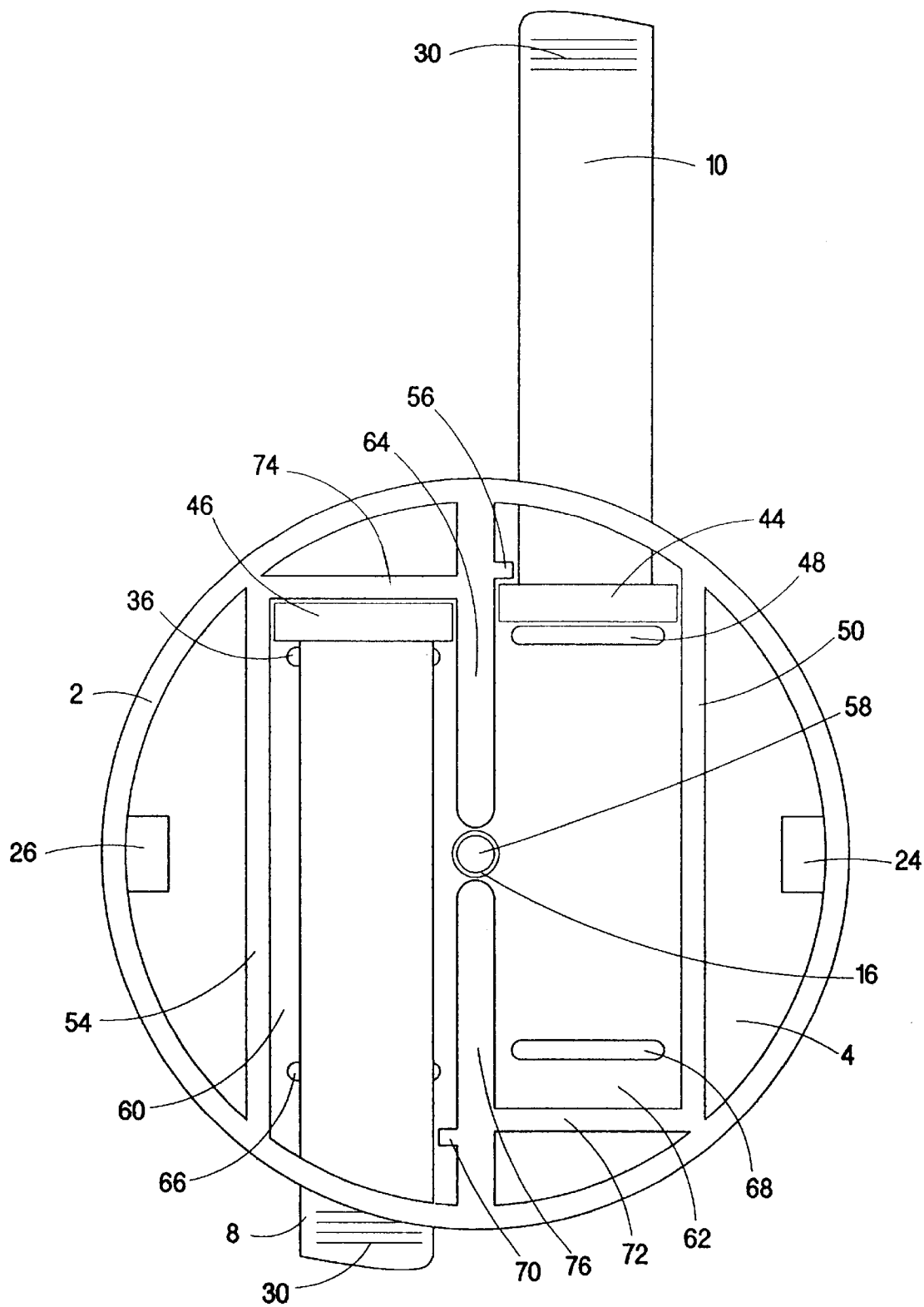
FIG. 4 is a view of the internal workings of the implement, such workings being exposed through detachment of the lower wall of the housing.

Referring now to the drawings and in particular to FIG. 1, the present inventive weed and grass trimming and debris blowing implement is referred to generally by Reference Numeral 1. The implement has a circular upper wall 4 and an annular upper side wall or outer wall 2 extending downwardly from the upper wall 4. An annular lower side wall or outer wall 6 removably extends downwardly from the lower end of the upper side wall 2. Referring simultaneously to FIGS. 2 and 3, a circular lower wall 32 spans across the upper end of the lower side wall 6, the lower wall 32 having a pair of flexible hooks 22 and 20 extending upwardly therefrom. Referring simultaneously to FIGS. 1, 3 and 4, the hooks 20 and 22 provide a detaching means allowing the lower wall 32 and lower side wall 6 to be alternately detached from and reattached to the upper wall 4 and upper side wall 2. The upper ends of the hooks 22 and 24 extend respectively through apertures 24 and 26 to engage with and latch the upper surface of the upper wall 4. By manually inwardly pressing the upper ends of hooks and 22 and 20, such hooks disengage, allowing the lower floor 32 and lower side wall 6 to fall away from the upper assembly of the implement 1. The reverse of the above steps reattaches the lower side wall 6 and lower floor.

Referring again to FIG. 1, the upper surface of the upper wall 4 preferably has a hollow cylindrical sleeve 12 molded as a part thereof and extending axially upward therefrom. A spirally threaded nut 16 is preferably fixedly embedded within the bore of the sleeve 12, the spirally threaded nut 16 providing means for attachment of the implement to the drive linkage of a gas powered or electric powered handheld or shoulder mounted weed trimmer. To provide structural rigidity to the sleeve 12, braces 14 are preferably molded integrally with the sleeve 12 and the upper wall 4. Referring simultaneously to FIGS. 1 and 4, where the drive linkage of the weed trimmer comprises a threaded aperture, as opposed to a threaded lug, the implement 1 may be attached by extending a spirally threaded bolt upwardly through aperture 58 for threaded mounting within the drive linkage of the weed trimmer.

Referring simultaneously to FIGS. 1, 2, and 3, a preferred embodiment of the implement 1 comprises a length of heavy gauge monofilament plastic line 18 which serves as a weed trimming member. The line 18 preferably extends as depicted through aperture 38 within the lower side wall 6, thence through apertures 42 within string retaining tab 34, and thence through aperture 40 within the lower side wall 6. Upon rapid rotation of the implement 1 while line 18 is so installed, the line 18 may perform weed and grass cutting without lateral slippage through apertures 38, 40, or 42. While the line retaining and extending structure depicted in FIG. 2 is preferred for its durability and simplicity, numerous other line retaining and extending mechanisms may be utilized. For example, within the space defined by the lower side wall 6 and lower floor 32, a monofilament line advancing spool may be installed. As a further alternative, pivoting plastic grass cutting blades may be installed upon the housing in place of the flexible line 18. Also alternately, pivoting or fixed steel blades may be utilized. Utilization of the flexible heavy gauge monofilament line 18 is preferred due to enhanced safety and due to cost economies.

Referring again to FIG. 1, fan blades 8 and 10 are outwardly extendable through apertures 28 from the outer surface of the upper side wall 2. Alternately, the fan blades may be slidably retracted into the interior space of the housing; such space being defined by the upper side wall 2, the upper wall 4, and, referring to FIG. 3, the lower wall 32. Full retraction of the fan blades 8 and 10 positions them as depicted in FIG. 2, allowing the line 18 to perform its grass and weed cutting function without interference or power reduction.

Referring simultaneously to FIGS. 3 and 4, fan blades 8 and 10 respectively slidably move within slide channels 60 and 62. Referring additionally to FIG. 1, sliding contact between fan blades 8 and 10 and the housing occurs between the outer surfaces of the fan blades 8 and 10 and the inner surfaces of apertures 28. Sliding contact also occurs between the outer surfaces of the enlarged bases 44 and 46 of fan blades 10 and 8, and the upper and lower slide surfaces of the slide channels 62 and 60; the downwardly facing surface of the upper wall 4 and the upwardly facing surface of the lower wall 32 providing such slide channel slide surfaces.

Referring further to FIGS. 3 and 4, the inwardly facing surface of the upper side wall 2 in combination with slide stops 56 and 70 prevent outward sliding motion of the fan blades 10 and 8 when such blades are in their fully extended positions. Similarly, slide stops 72 and 74 prevent the fan blades 10 and 8 from sliding inwardly beyond their fully retracted positions. In order to prevent fan blades 8 and 10 from freely sliding away from their fully retracted positions, convex protrusions or ridges 36 and 68 preferably extend downwardly into the slide channels 60 and 62 from the lower surface of the upper wall 4. Similarly, in order to prevent fan blades 8 and 10 from freely sliding away from their fully extended positions, convex protrusions or ridges 66 and 48 preferably similarly extend downwardly from the lower surface of the wall 4. Walls 50, 76, 64, and 54 are preferably integrally molded with the wall 4, serving as slide guides of the slide channels 60 and 62. Walls 50, 76, 64, and 54 prevent the enlarged ends 46 and 44 of the fan blades 8 and 10 from sliding laterally within slide channels 60 and 62.

Operation of the inventive implement 1, referring simultaneously to all figures, typically begins with fan blades 8 and 10 in their fully retracted positions. As depicted in FIG. 4, upon application, for example, of manual inward pressure to the outer end of fan blade 10, its enlarged end 44 may be driven over and past ridge 48, allowing the fan blade 10 to freely inwardly slide until the enlarged end 44 comes into contact with ridge 68. The manual pressure may then be increased to drive the enlarged end 44 over ridge 68, fixedly positioning the fan blade 10 in its fully retracted position. With fan blades 8 and 10 fully retracted and with a monofilament line 18 installed as depicted in FIG. 2, weed trimming or lawn edging may proceed unimpeded by the fan blades 8 and 10. Due to the weight of the enlarged ends 46 and 44, centrifugal force applied to the fan blades 8 and 10 while they are in their fully retracted positions, tends to hold the fan blades in such positions rather than driving them outwardly.

Performance of weed and grass trimming through rapid rotation of line 18 depicted in FIG. 2 will typically undesirably leave clippings and debris on sidewalk and curb surfaces. In order to utilize the implement 1 as a debris sweeping blower, the outer ends of fan blades 8 and 10 may be manually grasped so that the thumb and index finger of an operator's hand come into frictional contact with friction grooves 30 which are preferably molded into the upper and lower surfaces of the outer ends of fan blades 8 and 10. Manual pulling forces are then successively applied to fan blades 8 and 10, pulling the enlarged ends 44 and 46 thereof over ridges 36, 48, 66, and 68 until the blades reach their fully extended positions. While the fan blades 8 and 10 are in their fully extended positions, ridges 48 and 66 prevent such blades from freely sliding inwardly upon cessation of centrifugal force. As can be seen in FIG. 3, the fan blades 8 and 10 are preferably tilted at an angle, preferably between 30° and 45°, with respect to the axis of rotation of the implement 1. Such tilting of the fan blades 8 and 10 allows them to act as air foils, propelling air downwardly upon clockwise rotation of the implement 1. Such downwardly driven air efficiently blows and sweeps grass clippings and debris from sidewalk and curb surfaces.

After prolonged use of the implement 1, dust or dirt may accumulate within the slide channels 60 and 62, preventing the fan blades from smoothly extending and retracting. Also, through use, the fan blades 8 and 10 may become broken or damaged. Accumulation of dirt or occurrence of blade damage gives rise to a need for internal maintenance of the implement 1. Referring to FIG. 1, thumb pressure may be inwardly applied to the outwardly facing surfaces of hooks 20 and 22 driving the hooks inwardly within apertures 24 and 26. Upon pressing hooks 20 and 22 inwardly, the lower wall 32 may be removed, allowing removal of fan blades 8 and 10. After performance of interior cleaning or blade replacement, reversal of the disassembly steps reconfigures the implement 1 for use.

Preferably, all components of the implement 1 other than the nut 16 are fabricated through a plastic injection molding process. Blades 8 and 10 may comprise flexible synthetic rubber preventing bodily injury upon physical contact.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. An implement for trimming grass and weeds and for blowing clippings and debris, the implement comprising:

(a) a rotatable housing having an outer wall said rotatable housing an axis;

(b) a plurality of fan blades, each of the fan blade having an inner end and a outer end;

(c) slidable mounting means interconnecting each of the fan blades with the rotatable housing, the slidable mounting means allowing the outer ends of the fan blades to alternately extend from the outer wall of the rotatable housing to a fully extended position and retract toward said outer wall to a fully retracted position; the inner ends of the fan blades extending into the rotatable housing upon such retraction the movement of the fan blades between the fully extended and retracted positions being substantially perpendicular to the axis of the rotatable housing, the slidable mounting means comprising a plurality of channels positioned within the rotatable housing so that the outer wall surrounds the plurality of channels, the channels being fitted for slidably receiving the fan blades.

2. The implement of claim 1 further comprising a first plurality of slide stops adapted for preventing outward sliding motion of the fan blades while the fan blades are in their fully extended positions.

3. The implement of claim 2 further comprising a second plurality of slide stops adapted for preventing inward sliding motion of the fan blades, while the fan blades are in their fully retracted positions.

4. The implement of claim 1 wherein each channel comprises an upper slide surface and a lower slide surface, and wherein the rotatable housing comprises an upper wall and a lower wall, the upper slide surface of each channel facing downwardly from the upper wall, the lower slide surface of each channel facing upwardly from the lower wall.

5. The implement of claim 4 wherein the rotatable housing is composed of a material comprising injection molded plastic.

6. The implement of claim 4 further comprising detaching means allowing the lower wall and the lower slide surfaces of the channels to be alternately removed from and reattached to the rotatable housing.

7. The implement of claim 6 further comprising a weed trimming member fixedly attached to and extending outwardly from the outer wall of the rotatable housing.

8. The implement of claim 7 wherein the weed trimming member is selected from the group of flexible plastic lines, plastic blades, or steel blades.

9. The implement of claim 8 wherein the weed trimming member is positioned below the fan blades.

10. An implement for trimming grass and weeds, and for blowing clippings and debris, the implement comprising:

a) a rotatable housing having an outer wall said rotatable housing having an axis;

b) a plurality of fan blades, each of the fan blades having an inner end and an outer end; and c) slidable mounting means interconnecting each of the fan blades with the rotatable housing, the slidable mounting means allowing the outer ends of the fan blades to alternately extend from the outer wall of the rotatable housing to a fully extended position and retract toward said outer wall to a fully retracted position the movement of the fan blades between the fully extended and retracted positions being substantially perpendicular to the axis of the rotatable housing; the slidable mounting means comprising a plurality of channels positioned within the rotatable housing so that the outer wall surrounds the plurality of channels, the channels being fitted for slidably receiving the fan blades; the implement further comprising a first plurality of slide stops adapted for preventing outward sliding motion of the fan blades while the fan blades are in their fully extended positions; the implement further comprising a second plurality of slide stops adapted for preventing inward sliding motion of the fan blades while the fan blades are in their fully retracted positions; the implement further comprising a third plurality of slide stops adapted for resisting outward sliding motion of the fan blades while the fan blades are in their fully retracted positions.

11. The implement of claim 10 further comprising a fourth plurality of slide stops adapted for resisting inward sliding motion of the fan blades while the fan blades are in their fully extended positions.

12. The implement of claim 11 wherein the rotatable housing is composed of a material comprising injection molded plastic.

13. The implement of claim 11 further comprising a weed trimming member fixedly attached to and extending outwardly from the outer wall of the rotatable housing.

14. The implement of claim 13 wherein the weed trimming member is selected from the group of flexible plastic lines, plastic blades, or steel blades.

15. The implement of claim 14 wherein the weed trimming member is positioned below the fan blades.

16. An implement for trimming grass and weeds, and for blowing clippings and debris, the implement comprising:

(a) a rotatable housing having an outer wall;

(b) a plurality of fan blades, each of the fan blades having an inner end and a outer end; and (c) slidable mounting means interconnecting each of the fan blades with the rotatable housing, he slidable mounting means allowing the outer ends of the fan blades to alternately extend from the outer wall of the rotatable housing to a fully extended position and retract toward said outer wall to a fully retracted position; the slidable mounting means comprising a plurality of channels within the rotatable housing, the channels being fitted for slidably receiving the fan blades; the implement further comprising a first plurality of slide stops adapted for preventing outward sliding motion of the fan blades while the fan blades are in their fully extended positions; the implement further comprising a second plurality of slide stops adapted for preventing inward sliding motion of the fan blades, while the fan blades are in their fully retracted positions; the implement further comprising a third plurality of slide stops adapted for resisting outward sliding motion of the fan blades while the fan blades are in their fully retracted positions, the implement further comprising a fourth plurality of slide stops adapted for resisting inward sliding motion of the fan blades while the fan blades are in their fully extended positions.

17. The implement of claim 16 wherein the rotatable housing is composed of a material comprising injection molded plastic.

18. The implement of claim 16 further comprising a weed trimming member fixedly attached to and extending outwardly from the outer wall of the rotatable housing.

19. The implement of claim 18 wherein the weed trimming member is selected from the group of flexible plastic lines, plastic blades, and steel blades.

20. The implement of claim 19 wherein the weed trimming member is positioned below the fan blades.

* * * * *